March 16, 1943.  R. D. CLEMSON  2,314,077
MOWER
Original Filed Feb. 25, 1939

INVENTOR
RICHARD D. CLEMSON
BY
ATTORNEYS

Patented Mar. 16, 1943

2,314,077

UNITED STATES PATENT OFFICE 2,314,077

MOWER

Richard D. Clemson, Middletown, N. Y., assignor to Clemson Bros., Inc., Middletown, N. Y., a corporation of New York Original application February 25, 1939, Serial No. 258,362. Divided and this application April 11, 1939, Serial No. 267,227

4 Claims. (Cl. 56—253)

This invention relates to a mower of the rotary reel type.

It is an object of the invention to provide a mower having a separable self-contained cutter unit, including a rotary reel with suitable fly knives, a bed knife and driving connections therefor; which cutter unit may be separately assembled and adjusted into operative relation and handled as a unit separate from other parts of the mower; and which if it should become injured, worn or otherwise out of proper adjustment may be removed as a unit and returned to the factory for reconditioning or replaced by another similar unit in the same mower.

Another object of the invention is to provide a mower in which the operating parts above-mentioned are more securely retained in their proper operating relationship unaffected by strains to which other parts of the mover may be subjected in operation.

In the accompanying drawing I have shown a preferred embodiment of my invention and in the following description I have set forth a preferred embodiment and suggested various modifications thereof. It should be understood, however, that these are not intended to be exhaustive nor limiting of the invention, but on the contrary have been chosen for the purpose of illustrating the invention in order that others skilled in the art may more readily and fully understand the invention and may be fully instructed in the principles thereof and the best manner of applying the same in practical use, so that they may be enabled to utilize the invention in numerous forms and with numerous modifications, each as may be best adapted to the conditions of any particular use.

For simplicity of explanation I shall confine this description to hand operated mowers in which the power for rotating the cutting reel is derived and transmitted from the wheels in their traction on the ground. It will be obvious to those skilled in the art, however, that the invention is not limited to mowers of this type but may be applied with advantage in numerous and various types of mowers.

Figure 1:
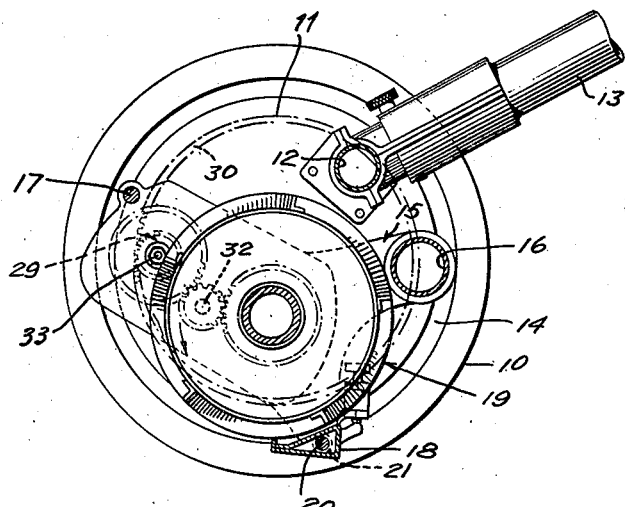
Figure 1 is a view in vertical section of a mower embodying a cutter assembly constructed according to my invention.

Referring to this drawing, the mower as shown comprises broadly the cutter unit and a carriage unit, the latter in the case of a mower having its reel driven from the wheels, serving also as a drive unit, although this function is not essential to my invention. The carriage unit consists broadly of the wheels 10 mounted on the side frames 11, which are rigidly connected together by the cross bar 12 bolted to the side frames as shown and which in this case carries the handle 13. The dust covers 14 secured as shown to the side frames 11 complete the carriage unit.

Figure 2:
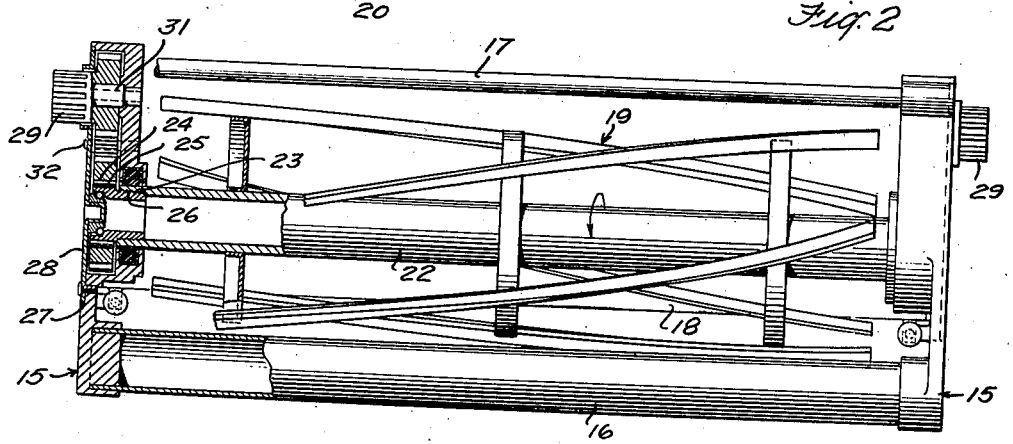
Figure 2 is a view partially in section and partially in plan of a cutter assembly constructed in accordance with my invention.
Figure 3:
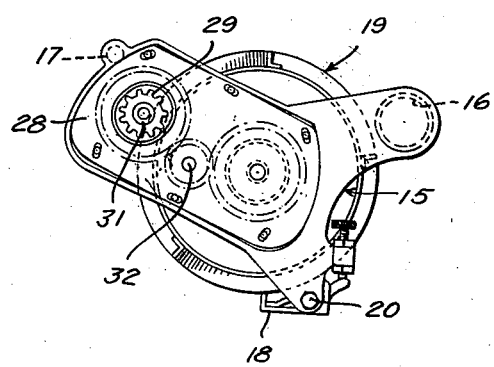
Figure 3 is a view in elevation of the assembly of Figure 2.

The cutter unit is, as shown in Fig. 2, a self-contained and substantially rigid structure adapted to be inserted into and carried by the carriage unit, but which may be inserted and removed without substantially affecting its adjustment or any relationship of the parts within itself. The rigidity of this structure is secured by the side frames 15 which are cast in situ into rigid connection with the cross bar 16 of sufficiently large diameter to assure rigidity and to prevent its working loose by any strain to which the frame may be subjected in use; and this frame is further stiffened and strengthened by a tie bar and guard 17 and by the bed knife 18 to which the side frames 15 are secured on the opposite sides of the reel 19 by means of the clamping bolt 20 in the ball and socket joint 21. Thus, the frame of the cutter unit is permanently and rigidly secured at the end of the cross bar 16 and is further braced and re-enforced by the tie bar 17 and the bed knife 18 cooperating with the bolt 20. The particular bed knife and its connection, however, are merely examples so far as the present invention is concerned. Per se they are more fully described and claimed in my copending application Serial No. 256,377, filed February 14, 1939, now Patent No. 2,260,297, granted October 28, 1941.

The reel construction shown lends itself to this permanent and rigid cutter unit frame construction. The main central portion of the reel axle 22 is made of tubular shafting which may be, for example, ordinary stock tubing or pipe. This portion may be no longer than the other parts of the reel or extending only so far beyond the other parts that by moving the reel as far as it will go in one direction the other end may be removed from its side frame 15 and swung entirely clear of the cutter frame. The central axle portion is extended by end portions 23, which may with advantage be of hard metal (as more particularly described and claimed in my copending application, Serial No. 267,226, filed April 11, 1939, now Patent No. 2,240,924, granted May 6, 1941), so as to provide a bearing surface at 24 and with a smooth circular surface at 25 which constitutes the inner member of an over-running clutch and with a slightly tapered threaded end at 26 which, being substantially harder than the material of the tubular axle portion 22, cuts its way into the inner surface of the tube and thus forms a threaded engagement, the thread at one end of the reel being, of course, right hand, whereas, the thread at the other end is left hand, so that in each case the driving torque tends to tighten the thread and hold the engagement. The construction and form of the reel proper is no part of the present invention, but forms the subject of another application, Serial No. 267,225, filed April 11, 1939.

The side frames 15 are formed with recesses or cavities 27 provided with covers 28 which together form a housing for the drive gear train. The last gear 29 of the train contained within this housing is extended through an opening in the cover 28 so as to engage with a ring gear 30 with which it meshes when the cutter unit is properly mounted on the carriage unit as shown in Fig. 1.

It will be noted that gear 29 is mounted on a tubular pivot 31 in the side frame 15. Tubular pivot 31 serves as the bearing for gear 29 and as a sleeve or socket through which a pin, such as 33 shown in Figure 1, may be passed for connection with side frame 11 of the carriage unit in the event the cutter unit of this invention is mounted in accordance with the teachings of application Ser. No. 258,362 filed February 25, 1939, of which this application is a division.

From what has been said it will be readily understood that the cutter unit may be assembled as such, fully adjusted and in every respect put in condition for operation before it is assembled into the carriage unit and in the same way a mower which has been in service may have the cutter unit replaced at any store or service station which handles these parts or by direct shipment from the factory; and the original cutter unit may be returned to the factory for regrinding and readjustment or whatever other repairs may be required.

Although I have shown my invention in connection with a mower of a particular type, it will be understood that this is merely illustrative, and that the invention herein claimed may be used with mowers of many types.

What I claim is:

1. A cutter assembly for lawn mowers comprising parallel vertical side frame members, at least one bar rigidly connecting said side frame members, a cutter reel, means mounting the ends of said cutter reel in said frames for rotation, a bed knife, means pivotally mounting the ends of the bed knife in said frames in cutting relation with respect to said reel, means wholly mounted on at least one of said frames for pivotally moving said bed knife to adjust the clearance thereof with respect to the reel, each side frame having a single socket therein adapted to receive a pin connectable to a vertical portion of a lawn mower carriage sub-assembly, said sockets constituting the sole points for connection between the vertical portions of said sub-assembly and the cutter assembly, whereby the latter may be conveniently removed as a unit for repair without disassembly of its components.

2. A cutter assembly for lawn mowers comprising parallel vertical side frame members, bars rigidly connecting said side frame members, a cutter reel, means mounting the ends of said cutter reel in said frames for rotation, a bed knife, means pivotally mounting the ends of the bed knife in said frames in cutting relation with respect to said reel, means wholly mounted on at least one of said frames for pivotally moving said bed knife to adjust the clearance thereof with respect to the reel, each side frame having means defining a single socket therein, driving gear means mounted on at least one of said means defining a socket, gearing establishing a driving connection between each driving gear means and the respective end of the cutter reel, all of said gearing being wholly supported on the respective side frame member, said sockets each being adapted to receive a pin connectable to the vertical portion of a lawn mower carriage sub-assembly, said sockets constituting the sole point of connection between said cutter assembly and the vertical portions of said carriage sub-assembly, a portion of each driving gear means projecting beyond the respective side frame, the projecting portion of each driving gear means being adapted to be engaged by a driving element constituting a part of the lawn mower carriage sub-assembly.

3. A cutter assembly for lawn mowers comprising parallel vertical side frame members, aligned projections extending inwardly from said side frame members, a hollow tube, the opposite ends of which extend over said projections, axial and radial anti-friction thrust bearings interposed between each end of said tube and the respective projection, bars rigidly connecting said side frame members to draw them together and thus to hold the hollow tube for free rotation therebetween, a cutting reel mounted on said tube with its blades concentric to the axis thereof, a bed knife, means pivotally mounting the ends of said bed knife in said frames in cutting relation with respect to the blades of said reel, means wholly mounted on at least one of said frames for pivotally moving said bed knife to adjust the clearance thereof with respect to the blades of the reel, each side frame having means defining a single socket therein, driving gears means mounted on each means defining a socket, gears establishing a driving connection between each driving gear and the respective end of the tube, all of said gears being supported wholly from the respective side frame member, said sockets each being adapted to receive a pin connected to the vertical portion of a lawn mower carriage sub-assembly, said sockets constituting the sole point of connection between said cutter assembly and the vertical portions of said carriage sub-assembly, a portion of each driving gear means projecting outwardly beyond the respective side frame, the projecting portion of each driving gear means being adapted to be engaged by a driving element constituting a part of the lawn mower carriage sub-assembly.

4. A cutter assembly for lawn mowers comprising parallel vertical side frame members, bars rigidly connecting said side frame members, a cutter reel, means mounting the ends of said cutter reel in said frames for rotation, a bed knife, means pivotally mounting the ends of the bed knife in said frames in cutting relation with respect to said reel, means wholly mounted on at least one of said frames for pivotally moving said bed knife to adjust the clearance thereof with respect to the reel, each side frame having means defining a single socket therein, each side frame also having a cavity therein, driving gear means rotatably mounted on each of said means defining a socket and extending partially within the respective cavity and partially without the same, gears establishing a driving connection between each driving gear means and the respective end of the cutter reel, all of said gears being wholly supported on the respective side frame member and lying wholly within the respective cavity thereof, said sockets each being adapted to receive a pin projecting inwardly from the vertical portion of a lawn mower carriage sub-assembly, said sockets constituting the sole point of connection between said cutter assembly and the vertical portions of said carriage sub-assembly, and a dust cover on each frame covering all portions of the respective cavity except that portion through which a portion of the driving gear means projects, the projecting portion of each driving gear being adapted to be engaged by a reel driving element constituting a part of the lawn mower carriage sub-assembly.

RICHARD D. CLEMSON.